UNITED STATES PATENT OFFICE.

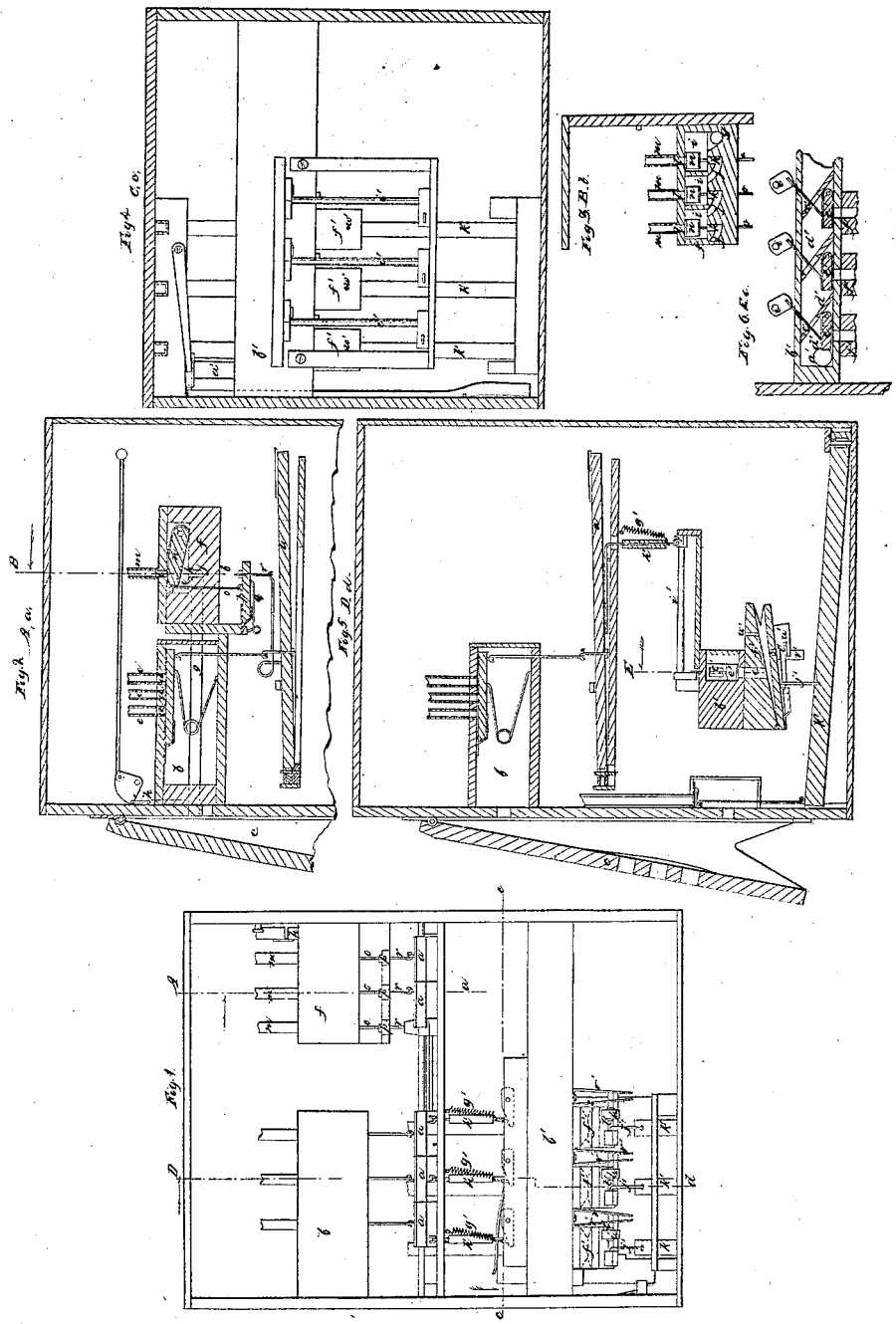

WILLIAM SUMNER, OF WORCESTER, MASSACHUSETTS.

ORGAN.

Specification forming part of Letters Patent No. 10,580, dated February 28, 1854; Reissued December 14, 1858, No. 635.

*To all whom it may concern:*

Be it known that I, WILLIAM SUMNER, of Worcester, Massachusetts, have invented certain new and useful Improvements in Organs and other Like Musical Instruments, of which the following is a full, clear, and exact description, reference being had to the accompanying drawings, making part of this specification, in which—

Figure 1, is a front elevation; Fig. 2, is a vertical section at A, a, Fig. 1; Fig. 3, is a cross section at B, b, Fig. 2; Fig. 4, is a horizontal section at C, c, Fig. 1; Fig. 5, is a vertical section at D, d, Fig. 1; Fig. 6, is a vertical section at E, e, Fig. 5.

The same letters indicate like parts in all the figures.

In organs as heretofore constructed, each key can be made to sound one note in each of a series of stops, and the number of stops can be regulated at pleasure by shutting off, or opening them; but when a given number of stops are opened, each key that is touched sounds a note in each of the stops.

The object of my invention is to have a stop or stops either for the bass or treble, which will sound only the extreme note on the left or right, that is, the bass or treble, or both, without reference to the number of keys that may be touched at once, and to this end.

The nature of my invention consists in the employment of a wind chest having one main passage leading from the bellows and branches leading therefrom to every pipe in one or more stops, which branches are each governed by a valve, which, when opened to admit the wind from the main passage, will, at the same time, shut off the wind from all parts of the main passage beyond it. In this way no matter what may be the number of keys touched, only one note, in each stop connected with this chest, will be sounded, and that, either on the extreme left for the bass, or the extreme right for the treble, the wind being by the same act shut off from all the others beyond. And the object of the second part of my invention is to operate the pedals which play the sub-bass, and sometimes the basses, by the action of the keys, so that the pedal corresponding to the extreme left key touched will be operated. And this part of my invention consists in combining with a wind chest on the principle of the first part of my invention, a series of auxiliary bellows which in turn are combined and connected with the pedals and with the keys, so that on touching the keys wind shall pass from the main bellows to the said improved wind chest, and thence into the corresponding auxiliary bellows, to work the corresponding pedal and sound the required note, the wind at the same time being shut off from all the auxiliary bellows beyond it.

The accompanying drawings represent so much of the machinery of an organ of the usual construction as will be useful in explaining the connection of my improvements; such as the series of keys $a$, the usual wind chest $b$, which conducts the wind from the main bellows $c$, by a pipe $d$, to the series of pipes $e$, for any required number of stops. At the right hand side there is one of my improved wind chests $f$, for the treble which receives wind from the main bellows by the pipe $g$, the aperture of which is governed in the usual manner by a sliding stop $h$.

The main passage consists of a series of chambers $i$, one for each note in the scale, and the bottom of each chamber has two apertures $j$, and $k$, one to receive the wind and the other to permit it to pass to the next chamber, and one aperture $l$, at the top leading to a channel communicating with a pipe $m$, or a series of pipes if there be more than one stop. In each channel there is a hinged valve $n$, which, when borne up, closes the aperture $l$, at top, and when drawn down opens this aperture $l$, and closes the aperture $k$ at bottom, which prevents the wind from passing to the chambers beyond.

Each valve is connected by a rod $o$, with a spring lever $p$, below, the tension of whose spring $q$, tends constantly to keep the valves up against the apertures at top. And this lever is in turn connected by a rod $r$, with a corresponding key $a$.

From the foregoing it will be seen that all the keys connected with the valves in this chest, will, when touched, operate the corresponding valves, but as the wind comes in from the right hand side, and the touch of the keys draws down the corresponding valve to open the apertures at top, and, at the same time closing the apertures $k$, at bottom through which the wind passes to the next chamber on the left, the consequence will be, that, no matter what number of keys connected with this chest may be touched at once, the one on the extreme right alone will be sounded, because the valve connected therewith, in the act of opening the aperture at top to admit the wind to its pipe or pipes, at the same time closes the aperture at bottom which leads to the next chamber on the left side of it, and hence from all beyond it. In this way no matter what may be the number of parts played, the treble only—that is the note on the extreme right—will be sounded in the extra stop or stops connected with this chest, so that at the pleasure of the performer he can give predominance to the treble.

It will be obvious from the foregoing that a like arrangement can be employed on the left or bass side, the direction of the wind being reversed, so that the extreme left note only will be sounded. And it will also be obvious that, if desired, the extra stop or stops can be so arranged in connection with my improved wind chest, that the note produced by the extreme left key touched will be one or more octaves below that sounded in the usual stops. The main bellows communicates by a pipe $a'$ with another wind chest $b'$ on my improved plan, having one main passage $c'$ through which the wind passes from left to right. And from this main passage there are a series of branches $d'$ with a valve $e'$ at the juncture of each branch with the main passage.

Each branch communicates with one of a series of auxiliary bellows $f'$. At the bottom of each key there is a rod $h'$, drawn up by the tension of a spring $g'$, and this rod is in turn connected with one arm of a rock shaft $i'$ the other arm of which is connected with a corresponding valve $e'$, in the chest $b'$, so that when the keys $a$ are pressed down, the corresponding valves in the chest will be operated to open the branches leading to the auxiliary bellows, and closing the main passage beyond, so that the wind from the main bellows can only pass into the branch which corresponds with the extreme left of the keys touched, on the principle before explained. The wind is thus admitted from the main bellows to the corresponding auxiliary bellows and will fill it and force down its flap which is connected by a rod $j'$ with a pedal $k'$ of a series, connected in the usual way with the sub-bass or other pipes usually played by the pedals. In this way I am enabled to play, with the keys, the notes which heretofore, for the want of sufficient power in the fingers, had to be played with the feet, and to sound only that note which corresponds with the extreme left key touched, no matter what number of keys may be touched at one and the same time to play the usual stops.

The return of the auxiliary bellows is self-acting. In the bottom flap there is an aperture $s'$ of less capacity than the aperture which admits the wind from the branch of the wind chest; and below this aperture there is a valve $t$, on the end of an arm hinged to the frame, and the forward end of this arm rests on a bracket $u'$, attached to the flap, so that when resting on the bracket the aperture is open. And this arm works between two friction plates $v'$, $v'$, so that when the wind rushes into the bellows, the escape aperture being smaller than the inlet, the flap will be suddenly forced down onto the valve which closes the aperture until the flap is entirely forced down. In the upper plate of the bellows there is a small aperture or vent $w'$ which permits a slight escape of wind and just enough to permit the flap, after the required time, to rise, and so soon as it begins to rise it leaves the valve $t'$ to permit the air to rush out and the flap and the pedal connected therewith to return to its original position, the bracket at the same time carrying up the arm and valve $t'$. I have used the terms auxiliary bellows to designate the apparatus which receives the wind from the main bellows to work the pedals, although strictly speaking they are not bellows but pneumatic flaps. And therefore any apparatus which will receive an equivalent action from the wind can be substituted for them; and although I have stated that the wind is supplied by the main bellows, I do not wish to be understood as limiting myself to the use of the organ bellows as any other blowing apparatus may be used instead.

The object of forming the connection between the keys $a$ and the rods that operate the valves, is to ease the action on the valve when thrown up to open the branch and close the main passage, but this is not indispensable as I do not wish to limit myself to the use of either of the two kinds of valves above described, as any valve or valves, which, by the action of the keys, will open the branches and close the main passage may be substituted for those which I have described. Nor do I wish to limit myself to any particular construction for the improved wind chest. I have described two modifications as illustrative of the changes which may be made in this and other parts within the principle or character of my invention, by the mere substitution of equivalents. Nor do I wish to be understood as limiting myself to the application of my invention to organs, as it is equally applicable to seraphines and other instruments played with keys to govern the passage of air to act on pipes, reeds, metal tongues or the equivalents thereof, for producing sound.

What I claim as my invention and desire to secure by Letters Patent in organs and other like instruments is—

1. The employment of a wind chest having a main passage for the wind and branches leading therefrom, and governed by valves substantially as specified, and connected and combined with the keys substantially as and for the purpose specified.

2. And I also claim in combination with a wind chest operating on the plan substantially as herein described, the employment of auxiliary bellows connected and combined with the main bellows and pedals, substantially as and for the purpose described.

WM. SUMNER.

Witnesses:
 WM. H. BISHOP,
 CHAS. W. BAMBURGH.

[FIRST PRINTED 1913.]